United States Patent [19]

Krum et al.

[11] Patent Number: 4,905,110

[45] Date of Patent: Feb. 27, 1990

[54] DISK DRIVE SPINDLE MOTOR

[75] Inventors: Richard G. Krum, Thousand Oaks; Eddy J. Milanes, Simi Valley; Michael B. Moir, Newbury Park, all of Calif.

[73] Assignee: Magnetic Peripherals Inc., Minnetonka, Minn.

[21] Appl. No.: 173,619

[22] Filed: Mar. 25, 1988

[51] Int. Cl.[4] ............................................. G11B 5/016
[52] U.S. Cl. .................................... 360/99.08; 310/156
[58] Field of Search ..................................... 360/97–98, 360/98.07, 98.08, 99.08, 99.09, 99.11; 310/156, 67 R, 179, 184

[56] References Cited

U.S. PATENT DOCUMENTS

| | | | |
|---|---|---|---|
| 4,634,906 | 1/1987 | Grosjean | 310/156 X |
| 4,672,253 | 6/1987 | Tajima | 310/156 X |
| 4,739,427 | 4/1988 | Kilmer | 360/97 |
| 4,754,351 | 6/1988 | Wright | 360/98.08 |
| 4,774,428 | 9/1988 | Konecny | 310/156 X |
| 4,779,165 | 10/1988 | Elsaesser | 360/99.08 |
| 4,780,777 | 10/1988 | Biermeier | 360/98.07 |

Primary Examiner—A. J. Heinz
Attorney, Agent, or Firm—Kelly, Bauersfeld & Lowry

[57] ABSTRACT

An improved spindle motor is provided for rotatably driving one or more memory storage disks in a computer disk drive or the like. The spindle motor comprises a stator shaft having opposite ends anchored to a disk drive housing, and a cylindrical rotor hub supported by bearings from the stator shaft for relatively high speed rotation. The stator shaft carries an armature in magnetically coupled relation with a high strength unitary permanent magnet sleeve carried by the rotor hub, with the number of armature poles and permanent magnet poles being mismatched to achieve low cogging motor operation. The memory disks have central openings therein and are mounted about the rotor hub for rotation during motor operation. Axially elongated resilient shim strips disposed about the rotor hub insure initial disk alignment with their inner diameter edges spaced from direct contact with the rotor hub, thereby permitting the hub and/or disks to accommodate normal thermal gradients during operation without positional shifting of the disks with respect to each other.

15 Claims, 3 Drawing Sheets

DISK DRIVE SPINDLE MOTOR

BACKGROUND OF THE INVENTION

This invention relates generally to improvements in spindle motors for use in computer disk drives and the like for rotatably driving one or more memory storage disks. More particularly, this invention relates to an improved disk drive spindle motor designed for integration directly into the spindle hub of a computer disk drive while providing sufficient driving torque to rotatably drive a stack of several memory storage disks.

In recent years, microcomputer equipment particularly such as so-called personal and desk top computers have become extremely popular for a wide variety of business and educational and other uses. Such computers commonly include a main central processor unit having one or more memory storage disks for storage of data. In many modern computers the storage disk or disks, sometimes referred to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable positioning arm are displaced by a precision stepper motor to traverse surfaces of the rotating disks for purposes of reading and writing data. Such Winchester-type disk drive units are generally preferred in comparison with so-called floppy type disk drives due to their higher memory storage capacities and faster operating speeds.

With the steadily increasing popularity of personal sized computers, various standard computer components have evolved to accommodate installation into computers produced by different manufacturers and/or to insure compatibility with commercially available software In this regard, Winchester-type disk drive units having one or more memory storage disks of an approximate 5.25 inch diameter have been manufactured and used on an industry-wide basis. More recently, smaller and lighter Winchester-type disk drives having storage disks of about 3.74 inches in diameter have become available. For either diametric size, the disk drive units have been produced in standardized vertical profile sizes to permit installation into a computer as an original equipment item, or as an after-market item to replace or upgrade an original disk drive unit. Specifically, disk drive units have been manufactured with a vertical dimension of about 3.25 inches to fit within a so-called "full height" vertical spacing, or with a vertical dimension of about 1.625 inches to fit within a so-called "half height" profile.

For any specific disk drive unit, the total memory storage capacity is related in large degree to the number of disks mounted within the disk drive housing. However, particularly for low profile "half height" disk drives, the number of storage disks which will fit within the available space together with the required spindle motor is extremely limited In this regard, disk drive spindle motors have traditionally been mounted in an underslung geometry positioned within the disk drive housing immediately below the storage disk or disks. Such underslung spindle motors have provided adequate drive torque to insure rapid disk rotational start-up and to achieve the desired high speed disk operation typically at about 3,000–3,600 rpm. However, these underslung spindle motors occupy a significant portion of the vertical profile of the disk drive, and thereby further restrict the number of disks which can be used. Alternate spindle motors have been proposed wherein a compact motor is incorporated directly into the spindle hub of the disk drive, thereby freeing vertical space to be occupied with additional storage disks. However, such in-hub spindle motors have generally suffered from inadequate drive torque which has precluded their use with an optimized stack of storage disks.

There exists, therefore, a significant need for improvements in spindle motors of the type used in computer disk drives, wherein the spindle motor is designed for in-hub mounting while providing sufficient drive torque for rotatably driving a maximum plurality of storage disks. The present invention fulfills these needs and provides further related advantages.

SUMMARY OF THE INVENTION

In accordance with the invention, an improved spindle motor is provided for rotatably driving one or more memory storage disks in a computer disk drive or the like. The spindle motor is designed for mounting directly into a rotary hub which supports a stack of storage disks with a precision spacing between the storage disks. The spindle motor provides substantial drive torque for rapid start-up and stable steady state operation, notwithstanding the use of a substantially optimized or maximum number of storage disks fitted within the available vertical profile.

In accordance with the preferred form of the invention, the spindle motor includes a stator shaft having its opposite ends anchored respectively to upper and lower housing members of a substantially sealed disk drive housing. The stator shaft is bonded near its opposite ends to the inner races of a pair of bearing units, the outer races of which are bonded in turn to a rotor hub formed from a magnetic flux carrying material such as an appropriate stainless steel. The rotor hub is thus rotatably supported by the stator shaft. The stack of memory storage disks is mounted about the rotor hub with appropriate spacer rings maintaining the disks in a precision spacing. A clamp member is secured to one end of the rotor hub and cooperates with a support flange at the opposite end of the rotor hub to retain the plural disks in stacked relation for rotation as a unit with the rotor hub.

The stator shaft carries a stack of generally ring-shaped armature laminations each having a plurality of radially outwardly projecting teeth separated by radially outwardly open slots for receiving armature windings. The armature windings and stacked laminations define a motor armature disposed concentrically within and in magnetically coupled relation with a high strength permanent magnet sleeve carried within the rotor hub. The preferred permanent magnet sleeve construction comprises a unitary or one-piece construction formed from a rare earth magnet material such as samarium cobalt in powder form retained by a binder in a unitary cylindrical configuration. The sleeve is magnetized to define an array of circumferentially spaced poles which alternate in polarity and are joined by narrow transition bands. The preferred sleeve geometry for computer disk drive use includes eight magnetic poles in combination with a total of nine armature teeth or poles to permit three phase motor operation with low cogging. A flux concentrator ring is also carried within the rotor hub at one end of the armature windings for flux coupling with a plurality of Hall-effect switches positioned radially within one end of the permanent magnet sleeve, wherein the Hall-effect switches provide motor directional and speed control in a known manner.

In accordance with further aspects of the invention, the rotor hub carries a plurality of preferably three or more axially extending shim strips on the exterior thereof. These shim strips are formed from a relatively soft and preferably nonmagnetizable material, such as plastic, and function to maintain inner diameter edges of the storage disks in spaced relation to the hub. In this manner, during disk drive operation, the disks and the hub are permitted to undergo thermal gradients without direct hub-disk contact which might otherwise result in positional shifting of one of the disks relative to the remaining disks.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
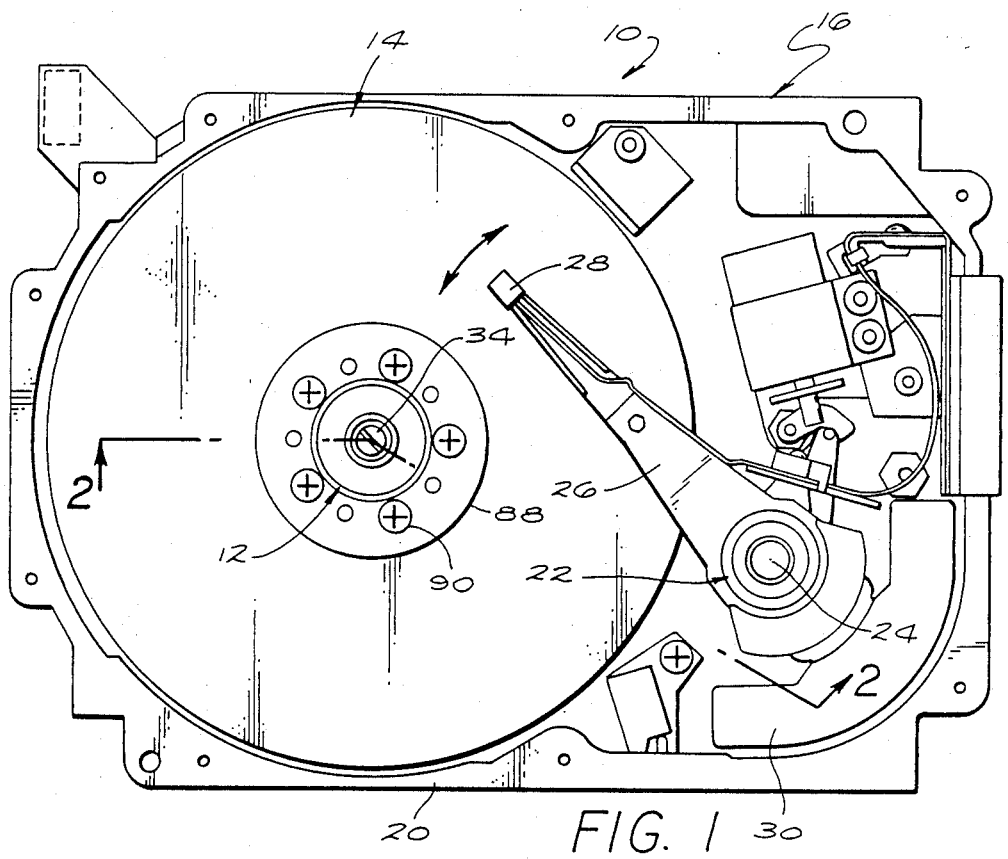
FIG. 1 is a top plan view depicting an exemplary computer disk drive incorporating an improved spindle motor embodying the novel features of the invention.

As shown in exemplary drawings, a computer disk drive referred to generally by the reference numeral 10 includes an improved spindle motor 12 for rotatably driving a stack of memory storage disks 14 in a personal computer or the like. The spindle motor 12 is integrated directly into the spindle hub of the stack of disks 14 and is designed to provide relatively smooth, low vibration and low cogging rotational driving of the disks 14. Importantly, the spindle motor 12 provides sufficient driving torque to rotationally drive a substantially maximum number of disks 14 which can be arranged to fit within the vertical profile available to the disk drive 10.

Figure 2:
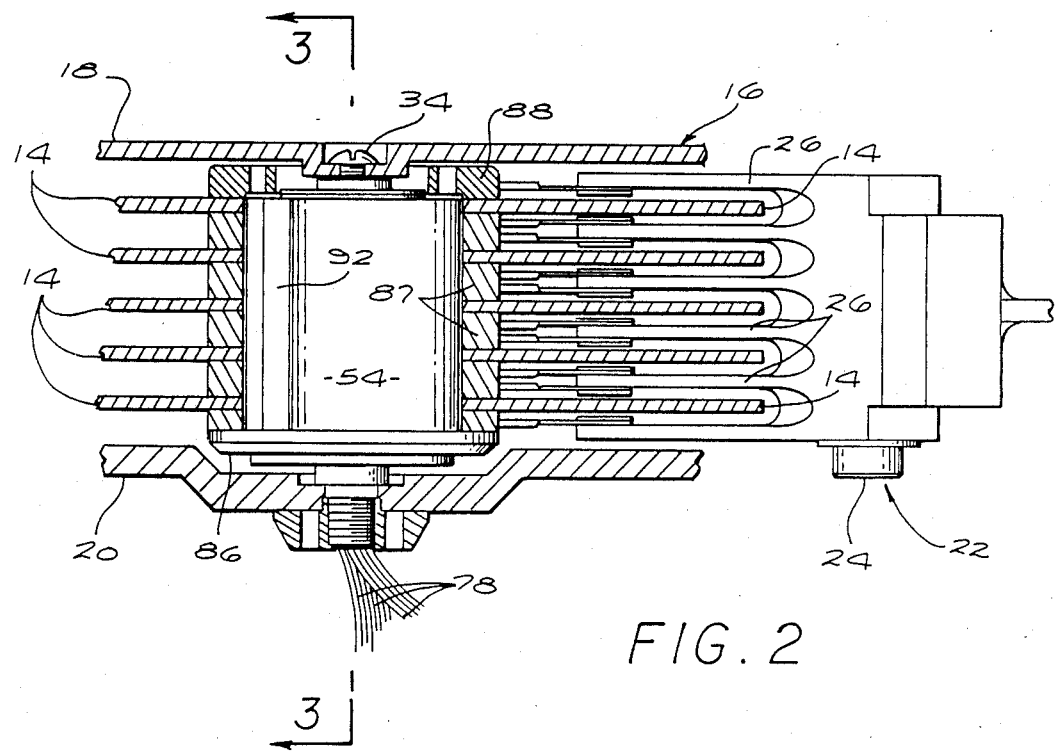
FIG. 2 is a fragmented vertical sectional view depicting the spindle motor rotatably supporting a stack of memory storage disks in operative relation with a head positioner assembly.

As shown generally in FIGS. 1 and 2, the disk drive 10 comprises a so-called "hard" disk drive of the general type used in modern personal computers and the like. The disk drive 10 conventionally includes a substantially sealed housing 16 defined by interconnected, generally shell-shaped upper and lower housing members 18 and 20. The sealed housing 16 has an overall size and shape with generally standardized external dimensions selected to fit within a limited installation envelope within a cabinet (not shown) for a central processor unit of a computer. For example, storage disks 14 having standard diametric sizes of about 5.25 inches and about 3.74 inches are known for use in disk drives having a vertical profile sized to fit within a full height dimension of about 3.25 inches, or within a half height dimension of about 1.625 inches. In accordance with a preferred disk drive geometry utilizing the spindle motor of the present invention, up to five storage disks 14 have been incorporated into a disk drive of half height dimension, thereby providing a substantially maximized data storage capacity within an extremely small envelope size.

As is generally known in the art, the illustrative disk drive 10 includes a head positioner assembly 22 mounted within the sealed housing 16 at a position alongside the disk stack. The head positioner assembly 22 is movably supported within the housing by means of a bearing 24 or the like and supports a plurality of individual arms 26 having electromagnetic heads 28 at the distal ends thereof in close proximity with respective upper and lower surfaces on the disks 14. A suitable actuator motor referred to generally by the reference numeral 30, such as a movable coil dc motor, and a corresponding motor controller (not shown) function to displace the heads 28 through generally radial traverses relative to the disks 14 for purposes of reading and writing data, all in a well known manner.

Figure 3:
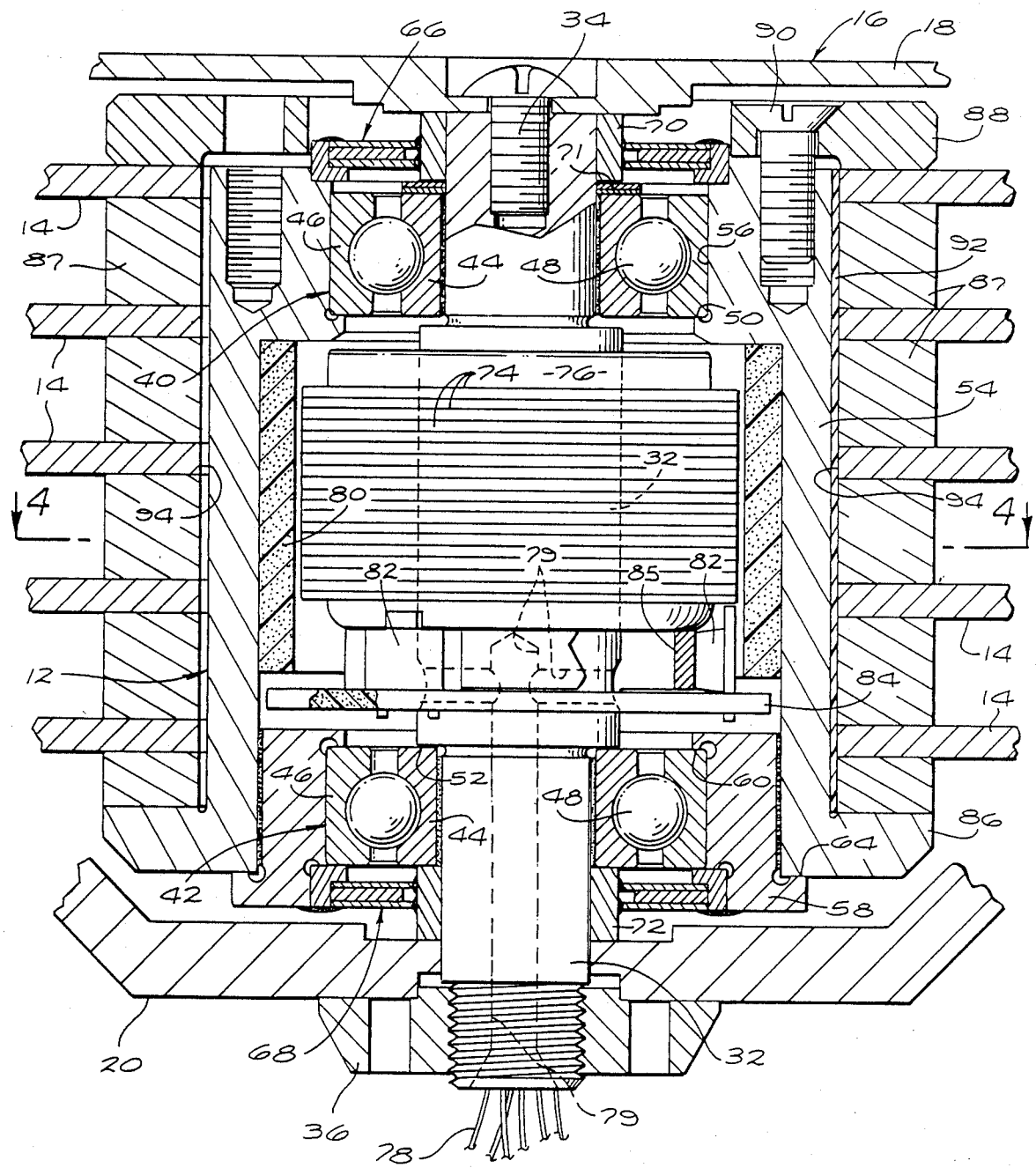
FIG. 3 is an enlarged vertical sectional view taken generally on the line 3—3 of FIG. 2.

As shown best in FIGS. 2 and 3, the improved spindle motor 12 is securely mounted within a central hub region of the stack of disks 14 in a position extending between the upper and lower housing members 18 and 20 of the disk drive housing. More specifically, the spindle motor 12 comprises a central stator shaft 32 formed from magnetic stainless steel or the like to extend between the upper and lower housing members 18 and 20. For enhanced stiffness to avoid the occurrence of natural resonance frequencies within a normal operating range for the motor, the stator shaft 32 is anchored to the upper and lower housing members. Such anchoring is shown in FIGS. 2 and 3 which depict a screw 34 fastened through the upper housing member 18 into a threaded bore at the upper end of the stator shaft, and a threaded nut 36 fastened onto a threaded lower end of the stator shaft which projects downwardly through an opening in the lower housing member 20.

The stator shaft 32 is formed by machining or the like to accommodate predetermined positional mounting of upper and lower bearing units 40 and 42. More specifically, the two bearing units 40 and 42 comprise a pair of precision ball bearing units each having an annular inner race 44 cooperating with an annular outer race 46 to contain an annular array of bearing balls 48 therebetween. The upper bearing unit 40 is bonded onto a relatively small diameter upper end of the stator shaft 32. Similarly, the lower bearing unit 42 is bonded onto a relatively small diameter lower end of the stator shaft 32 toward a position with its inner race 44 seated against an axially downwardly presented shoulder stop 52 on the stator shaft. The securement of both inner races 44 by bonding onto their respective regions of the stator shaft effectively combines with the stator shaft to increase the overall stiffness of the motor. In combination with the stator shaft anchoring at opposite ends to the housing this arrangement effectively precludes the occurrence of a natural resonant frequency at a normal operating speed of about 3,600 rpm.

The outer races 46 of the two bearing units 40 and 42 rotatably support a generally cylindrical rotor hub 54 constituting the rotor of the spindle motor 12. As shown in FIG. 3, the outer race 46 of the upper bearing unit 40 is secured directly within an upper bore 56 of the rotor hub in seated relation against an inwardly radiating shoulder stop 50. The lower bearing unit 42, however, has its outer race 46 seated within an annular cap ring 58 which in turn is seated within the open lower end of the rotor hub 54. An inner shoulder stop 60 within the cap ring 58 serves as an alignment stop for the outer bearing race 46, and an outer shoulder stop 64 on the cap ring 58 engages the axially lower end of the rotor hub 54 to position the cap ring in the desired axial position For optimum assembly, the outer races of the bearing units as well as the exterior diameter of the cap ring 58, are secured in place by bonding, in a manner similar to the previously described bonding of the inner races 44 to the stator shaft 32.

The rotary interfaces between the stator shaft 32 and the rotor hub 54 are sealed to prevent migration of bearing contaminants or the like into contact with the memory storage disks 14. Although the specific structure of the requisite sealing means may vary, conventional exclusion fluid seal units 66 and 68 are preferred. Such seal units are shown mounted respectively at the upper and lower ends of the rotor hub 54 and define radially inwardly presented exclusion fluid seal faces in running engagement with aligned seal rings 70 and 72 which are bonded onto the stator shaft 32. A pair of Belleville washer springs 71 are provided to react between the upper seal ring 70 and the inner race of the upper bearing unit 40 to insure axial retention of the bearing unit, whereas the lower seal ring 72 conveniently functions in addition as a thrust member reacting between the inboard face of the lower housing member 20 and the adjacent end of the inner race 44 of the lower bearing member 42.

Figure 4:
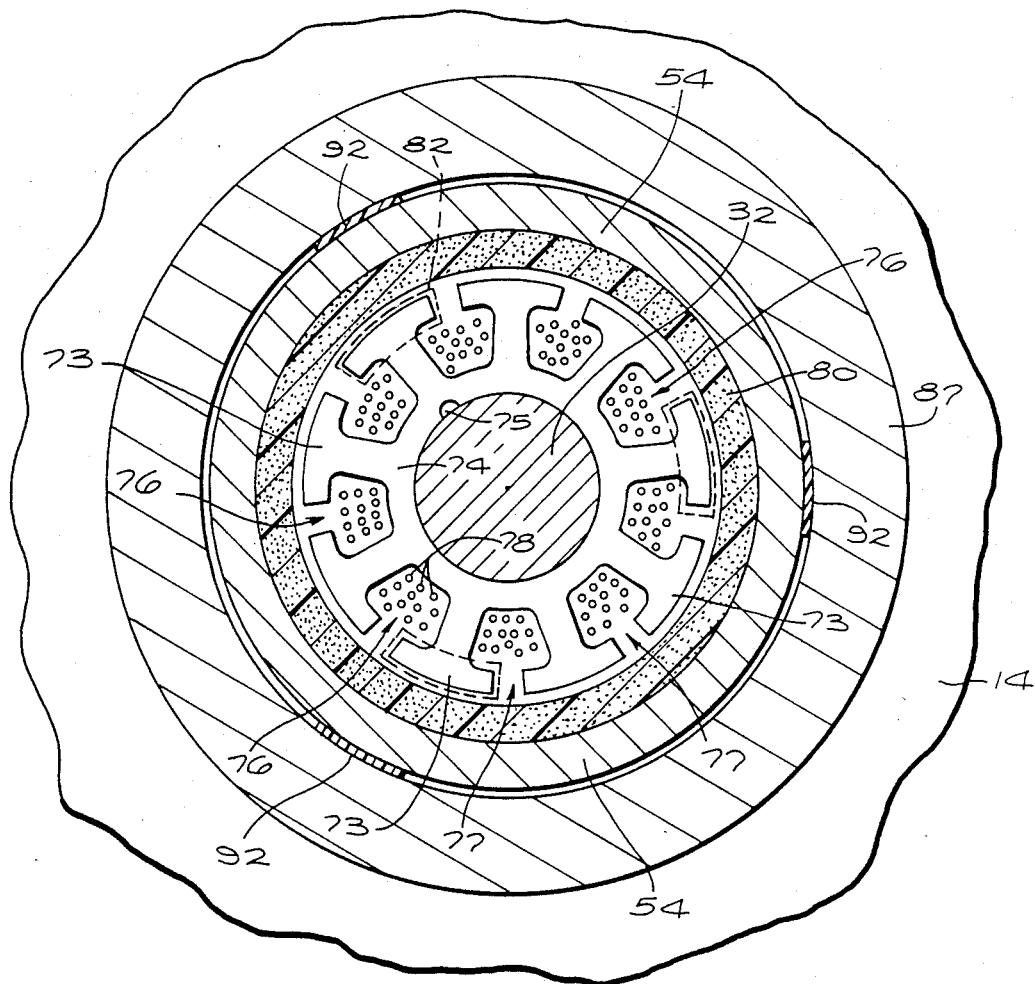
FIG. 4 is a horizontal sectional view taken generally on the line 4—4 of FIG. 3.

The stator shaft 32 carries a stacked plurality of generally ring-shaped armature laminations 74 which support armature windings 76 for the spindle motor. More particularly, as viewed best in FIGS. 3 and 4, these armature laminations 74 are received in stacked relation about the stator shaft 32 in appropriate vertical alignment with each other and in a predetermined rotational position relative to the stator shaft 32. In this regard, the laminations may include inner notches 75 which assist in insuring the desired lamination alignment. The laminations 74 are preferably formed from a soft magnetic steel and are mounted onto the stator shaft 32 as by an interference fit which may be facilitated by the use of axially elongated serrations (not shown) on the stator shaft. As a stacked group, the armature laminations 74 define a plurality of radially outwardly extending teeth or poles 73 separated by a corresponding plurality of radially outwardly open, equiangularly arranged slots 77. As is known in the art, the stacked laminations 74 are coated with a suitable epoxy prior to winding of the armature windings 76 within the slots 77 to form the armature for the motor. FIG. 4 shows a total of nine armature poles 73, thereby providing a total of three armature poles for each phase of the motor during standard three phase operation, as will be described in more detail. The conductors 78 forming the various windings are coupled through passages 79 to the lower end of the stator shaft 32 (FIGS. 2 and 3) for passage to the underside of the disk drive housing 16 and appropriate connection thereat to associated control circuitry (not shown) for controlling motor operation.

Figure 5:
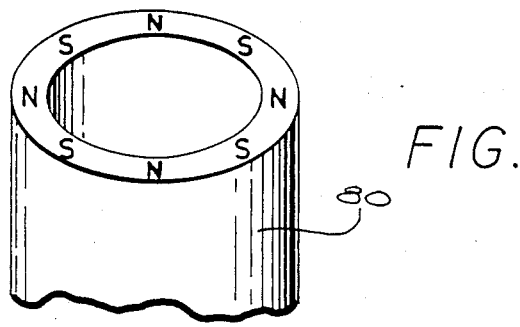
FIG. 5 is a fragmented perspective view showing a permanent magnet sleeve for use in the spindle motor.

The thus-wound armature of the spindle motor 12 is positioned concentrically within a cylindrical permanent magnet sleeve 80 which is mounted by press fitting and/or by bonding into the interior of the rotor hub 54. This permanent magnet sleeve 80 is formed in the preferred embodiment of the invention as a one-piece or unitary component, as shown best in FIG. 5, and from a high energy magnet material such as a rare earth magnet material. The preferred permanent magnet material comprises a samarium cobalt base in powder form mixed with an appropriate plastic binder or the like and compressed to the desired cylindrical size and shape. After formation of the sleeve 80, the sleeve is magnetized to define a circumferentially arranged plurality of eight alternately positioned North and South poles, wherein the number of magnet poles is specifically chosen to be a numerical mismatch relative to the number of armature poles.

Upon supply of electrical power to the armature windings 76, under appropriate control as is known in the art, the flux coupling between the armature windings and the magnet 80 results in rotational driving of the rotor hub 54. In this regard, the hub 54 beneficially provides an integral portion of the flux path coupling the various magnet poles. This use of the rotor hub 54 as part of the flux map, in combination with the use of eight magnetic poles in a disk drive application, permits the use of high energy rare earth magnets for relatively high driving torque without significant flux leakage externally of the rotor hub. Such prevention of significant flux leakage is, of course, desirable to avoid adverse impact upon disk data surfaces disposed near the rotor hub.

Figure 6:
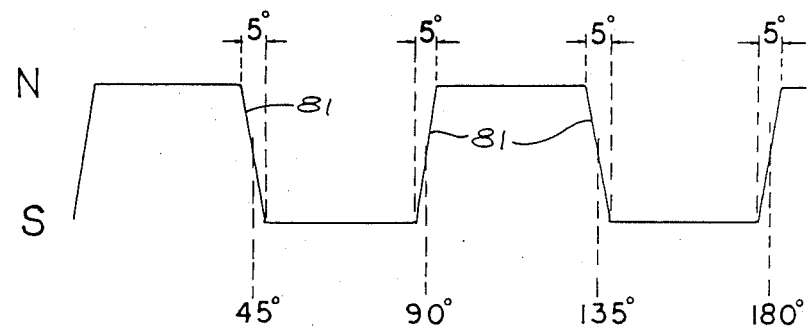
FIG. 6 is a chart depicting magnetization characteristics of the permanent magnet sleeve of FIG. 5.

In operation, the rotor hub 54 is rotatably driven smoothly and with relatively low motor cogging. This relatively low cogging characteristic is obtained, notwithstanding the use of the high strength magnet 80, by means of the numerical mismatch between the armature poles and magnet poles. That is, with a total of eight magnet poles and nine armature poles, the interpolar alignment between the armature and the magnet precludes any significant torque fluctuations throughout each full revolution of the rotor. Such relatively low cogging operation is further enhanced by forming the magnetic poles on the permanent magnet to be separated by relatively narrow transition bands 81 (FIG. 6) of gradually diminishing strength and then reversing in polarity with increasing strength with a band width of about five degrees.

In accordance with a further aspect of the spindle motor, a plurality of Hall-effect switches 82 (FIGS. 3 and 4) are mounted in 120° intervals on an appropriate annular support board 84 at one axial end of the armature, and in a position radially inset slightly from one axial end of the permanent magnet 80. A flux concentrator ring 85 of an appropriate flux carrying material protrudes axially from the armature to assist in coupling the generated magnetic flux to the Hall-effect switches 82, without requiring additional windings or additional magnets for use therewith. These Hall-effect switches function in a manner known to those skilled in the art to detect and respond to changing motor phases for purposes of controlling motor speed and direction. In this regard, the general operation of Hall-effect switches for controlled commutation of a permanent magnet motor is described in C. G. Vienott, *Fractional- & Subfractional-Horsepower Electric Motors*, pgs. 282-283 (3d ed. 1970), which is incorporated by reference herein.

The rotatably driven rotor hub 54 supports the stack of storage disks 14 for rotation within the disk drive housing 16. In this regard, the disks 14 are stacked upon a lower outer support flange 86 of the rotor hub 54. The disks 14 are separated from each other by intervening spacer rings 87 of precision height, thereby orienting the disks 14 in a precision spacing for access therebetween of the various heads (FIG. 2). An upper clamp ring or member 88 is fastened onto the upper end of the rotor hub 54 by a plurality of screws 90 or the like to compress the stack of disks 14 and related spacer rings 87. Accordingly, when the rotor hub is driven during motor operation, the group of disks 14 are rotated as a collective unit.

In accordance with still further features of the improved spindle motor, the rotor hub 54 includes a plurality of relatively soft and preferably resilient shim strips 92 for maintaining the inner diameter edges 94 of the individual disks 14 in radially spaced relation from the rotor hub 54. As shown best in FIG. 4, the rotor hub 54 includes at least three axially elongated shim strips 92 of a material such as cast Teflon or the like and arranged at about 120° intervals about the hub. These shim strips have thicknesses on the order of about 0.005 inch to insure initial disk stacking with their inner diameter edges in spaced relation to the hub. With this geometry, during normal anticipated thermal loads encountered during motor operation, thermal size variations of the hub and/or the disks will be insufficient to permit the hub to contact any one of the disks. As a result, lateral shifting of the disks relative to each other is substantially prevented, wherein such lateral shifting could otherwise result in positioning errors during disk drive operation.

The improved disk drive spindle motor 12 of the present thus provides a relatively stiff and high energy motor mounted directly in the rotary hub of a disk stack. The spindle motor is designed for use in driving up to a maximum number of memory storage disks which can be installed into the available vertical size envelope, with rapid disk rotational start-up and stable steady state operation at relatively high rotational speed.

A variety of further modifications and improvements to the spindle motor described above will be apparent to those skilled in the art. Accordingly, no limitation on the invention is intended by way of the foregoing description or the accompanying drawings, except as set forth in the appended claims.

What is claimed is:

1. A disk drive spindle motor for rotatably driving a plurality of memory storage disks or the like, said spindle motor comprising:
   a stator shaft;
   an armature carried by said stator shaft;
   a rotor hub;
   means for rotatably supporting said rotor hub from said stator shaft;
   a permanent magnet sleeve carried by said rotor hub in a magnetic coupled relation with said armature, said sleeve having a one piece configuration including a plurality of circumferentially arranged alternating poles, whereby said permanent magnet sleeve and said hub are rotatably driven upon supply of electrical power to said armature;
   Hall-effect switch means carried by said stator shaft generally at one end of said armature and at a position generally radially within one end of said permanent magnet sleeve, said Hall-effect switch means detecting and responding to changing motor phases to control motor rotational speed and direction; and
   a flux concentrator ring carried by said stator shaft at a position adjacent said armature in magnetically coupled relation with said Hall-effect switch means.

2. The disk drive spindle motor of claim 1 wherein said rotor hub includes means for supporting a plurality of the memory storage disks in stacked relation.

3. The disk drive spindle motor of claim 1 wherein said rotor hub is formed from a magnetic flux carrying material.

4. The disk drive spindle motor of claim 1 wherein said rotor hub is formed from a magnetic flux carrying material, and further including means for supporting at least one memory storage disk about said rotor hub.

5. The disk drive spindle motor of claim 4 further including a plurality of axially extending shim strips mounted onto the exterior of said rotor hub, said shim strips being formed from a relatively soft material and arranged in spaced relation about the circumference of said hub.

6. The disk drive spindle motor of claim 5 wherein at least three of said shim strips are provided about said rotor hub in a generally equiangularly spaced array.

7. The disk drive spindle motor of claim 5 wherein said shim strips are formed from Teflon.

8. The spindle motor of claim 5 wherein said shim strips are formed from Teflon.

9. The disk drive spindle motor of claim 1 wherein said permanent magnet sleeve is formed from a rare earth magnet material.

10. The disk drive spindle motor of claim 9 wherein said sleeve is formed from samarium cobalt in powder form retained in generally cylindrical shape by a binder.

11. The disk drive spindle motor of claim 1 wherein said armature has a total of nine poles and said permanent magnet sleeve has a total of eight poles.

12. The spindle motor of claim 1 further including a plurality of memory storage disks each having a central opening therein and mounted about said rotor hub in a generally aligned stack.

13. The disk drive spindle motor of claim 1 wherein said means for rotatably supporting said rotor hub comprises a pair of bearing units having inner races bonded to said stator shaft generally at opposite ends thereof, a respective pair of outer races secured to said rotor hub, and bearing members for respectively rotatably supporting said outer races relative to said inner races.

14. The disk drive spindle motor of claim 1 further including a disk drive housing having upper and lower housing portions, and means for securing said stator shaft generally at opposite ends thereof respectively to said upper and lower housing portions.

15. A disk drive spindle motor for rotatably driving a plurality of memory storage disks or the like, said spindle motor comprising:
   a stator shaft;
   an armature carried by said stator shaft;
   a rotor hub;
   means for rotatably supporting said rotor hub from said stator shaft; and
   a permanent magnet sleeve carried by said rotor hub in magnetic coupled relation with said armature, said sleeve having a one-piece configuration including a plurality of circumferentially arranged alternating poles, whereby said permanent magnet sleeve and said hub are rotatably driven upon supply of electrical power to said armature;
   said armature having a total of nine poles and said permanent magnet having a total of eight poles;
   said poles of said permanent magnet sleeve being separated by transition bands of smoothly changing polarity, each of said transition bands having a band width of at least about five degrees.

* * * * *